June 14, 1938.  L. R. BOGARDUS  2,120,775
COMBINED TROLLEY AND EXTENSION LAMP
Filed April 20, 1934
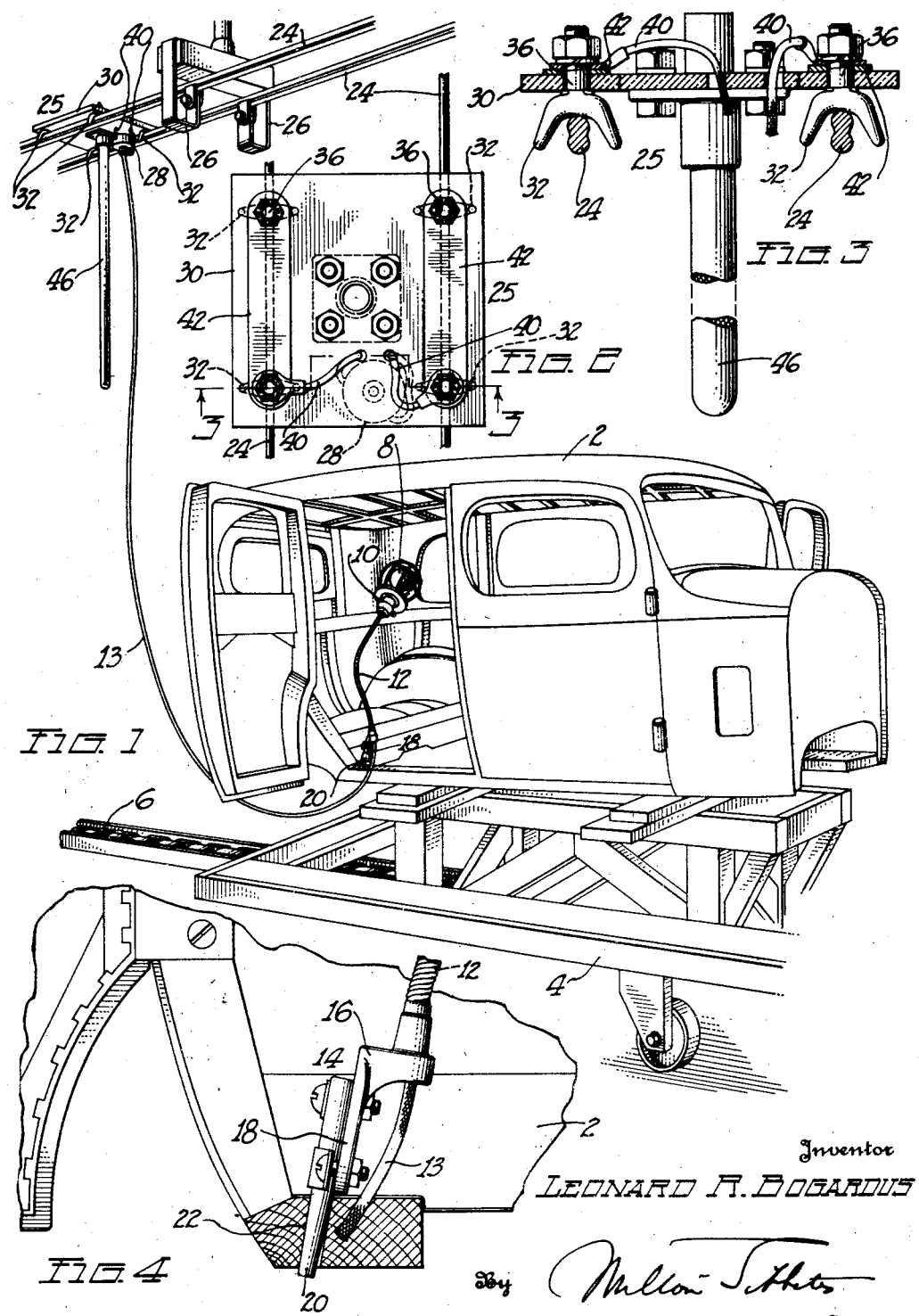
Inventor
LEONARD R. BOGARDUS
By
Attorney Patented June 14, 1938

2,120,775

UNITED STATES PATENT OFFICE

2,120,775

COMBINED TROLLEY AND EXTENSION LAMP

Leonard R. Bogardus, Grosse Pointe Farms, Mich., assignor to Packard Motor Car Company, Detroit, Mich., a corporation of Michigan Application April 20, 1934, Serial No. 721,455

4 Claims. (Cl. 240—2)

This invention relates to motor vehicles and more particularly to electrical lighting devices for lighting the parts of motor vehicles during their movement along a line in the process of manufacture.

This invention is particularly intended as an improvement in lighting systems for lighting the interiors of the bodies of motor vehicles while moving along an assembly line. The invention, however, is not limited in its application to lighting systems for lighting the parts of automobile bodies but certain features thereof may be embodied with advantage in lighting systems for lighting other parts of motor vehicles while moving along a line.

In one of the present systems in extensive use for lighting the interiors of motor vehicle bodies while moving along an assembly line, a lamp with an extension cord is provided at each station. When a body reaches a station, the lamp is placed within the body by one of the workmen at the station to enable them to see properly to perform the work required on the interior of the body at that station. When the body leaves a station the extension lamp for that station is removed from the body. This system requires a relatively large number of electrical fixtures along the line. Also, the carrying of the lamps into and out of the bodies as the bodies pass from station to station along the line takes, in the aggregate, a considerable amount of time.

In another system extensively used, the interiors of the bodies are lighted from exterior lamps fixed at different points along the line. The light from these lamps produces heavy shadows inside the bodies and lamps of relatively high power must be employed to give the required amount of light. This system therefore is expensive to use.

One object of the present invention is to improve the construction and mode of operation of lighting systems for lighting the parts of motor vehicles while moving along a line in the process of manufacture, and to produce a lighting system of this character which will avoid the disadvantages of the systems above briefly described.

Other objects of the invention are to produce a novel and improved lighting system which will light efficiently the interiors of the bodies of motor vehicles while moving along a line, which does not require the changing of the lamps in passing from station to station, and which will not involve a relatively heavy expense in the operation thereof.

With the above and other objects in view, the invention consists in an electrical lighting system embodying the novel and improved features hereinafter described and particularly pointed out in the claims the advantages of which will be readily understood by those skilled in the art.

The features of the invention will be clearly understood from the accompanying drawing illustrating a lighting system embodying the invention in its preferred form and the following detailed description of the constructions therein shown.

In the drawing, Fig. 1 is a perspective view illustrating a lighting system embodying the invention arranged along an assembly line for automobile bodies and showing the manner in which the system is applied in lighting the interior of a body;

Fig. 2 is a detail plan view illustrating a trolley or carriage forming part of the lighting system;

Fig. 3 is a view in vertical section taken substantially on the line 3—3 of Fig. 2 and, Fig. 4 is a detail view in side elevation illustrating particularly a bracket forming one of the elements for supporting a lamp applied to the body of a motor vehicle.

As shown in the drawing of this application, the invention is applied to an assembly line for automobile bodies. The drawing shows a body indicated at 2, mounted on a support indicated at 4 for movement along the line. The support 4 is moved along the line to carry the body from station to station by means of the usual operating chain indicated at 6.

In the form illustrated in the drawing, the system comprises an extension light indicated at 8 mounted for movement with the body 2 through the different stations along the line at which operations upon the inside of the body are to be performed. This lamp is mounted upon the body for movement therewith. As shown, the lamp is mounted in a socket 10 secured to the upper end of a flexible hollow self sustaining support 12 through which passes the extension cord 13 containing the wires leading to the terminals inside the socket 10. The lower end of the support 12 is secured to a bracket 14 shown in detail in Fig. 4.

The bracket 14 is formed with an upper portion 16 to which the lower end of the support 12 is secured, and with an extension 18 secured to the portion 16 and having a projection 20 preferably tapered in form for insertion in a bolt hole in the body, such as that indicated at 22.

The lamp 8 is supplied with current from the conductors or rails 24 extending along the line and preferably arranged substantially parallel therewith. A trolley or carriage 25 is arranged to travel along the conductors 24, and is provided with contacts having sliding engagement with the conductors 24 and connected with the conductors within the extension cord 14. The conductors 24 are supported from the ceiling by means of suitably insulated supporting brackets 26. The conductors within the extension cord 14 are connected with terminals within a plug 28 secured to the under side of a plate 30 of insulating material and forming part of the trolley or carriage 25.

To the underside of the plate 30 are secured the contacts 32 arranged to engage the conductors 24 as shown in Fig. 3 and to slide along the same during the movement of the carriage, the contacts 32 on one side of the carriage being arranged to engage one of the conductors 24, and the contacts 32 on the other side of the carriage being arranged to engage the other of said conductors. The contacts 32 are secured respectively to plate 30 by means of bolts 36 passing through suitable openings in the plate. To the two bolts 36 at one end of the carriage are connected the conductors 40 leading to terminals within the plug 26. The two bolts 36, one on each side of the carriage, are connected by a conductor plate 42.

With the above construction, the lamp 8 is attached to and carried by the motor vehicle body and is moved from station to station with said body as the body progresses along the line. During the movement of the body, the extension cord 14 is drawn taut and the carriage is drawn along the conductors 24 without attention on the part of the workmen. The flexible self sustaining support 12 enables the lamp to be placed in various positions in the body so that the different portions of its interior may be efficiently illuminated during the operations performed thereon by the workmen. The adjustment of this support enables the lamp to be located in a position such that it will light satisfactorily the part of the body which is being operated upon by a workman and at the same time will not interfere with the movements of the workman. As shown, the lamp is mounted on the lower margin of the door frame and extends therefrom into the body giving ample room for the workmen to work around the same.

The bracket 14 forms a simple and efficient device for removably attaching the lamp to the body. When the body reaches the end of the line, the bracket 14 is detached from the door frame, the lamp and carriage 25 are moved to the opposite end of the line and the bracket is attached to another body by inserting the projection 20 in a bolt hole.

To enable a workman to move the carriage along the conductors 24, if at any time this is desired, a handle 46 preferably made of wood is secured to the under side of the plate 30 and extends downwardly therefrom in a position such that it may be easily reached by the workman.

It is to be understood that the invention is not limited to the particular construction and arrangement of parts of the illustrated embodiment of the invention but that the construction shown and described is merely illustrative of the invention and that the invention may be embodied in other forms within the scope of the claims.

Having explained the nature and object of the invention and having specifically described a construction embodying the invention in its preferred form, what is claimed is:

1. In combination with conductor means having a plurality of spaced electrified overhead rails provided with upper track surfaces, of an electric power take-off means comprising a plurality of spaced contact members for straddling and engaging said track surfaces, said members having depending ends preventing their horizontal displacement from said engaged track, a plate on which said members are mounted, an extension cord means associated with said contact members and said plate for conveying electrical power from said members and for moving said plate along said track surfaces, and a depending handle fixed to said plate means between said contact members, said handle providing means for handling said plate to apply or remove said contact members relative to said rails.

2. In combination with an assembly line having electrical power consuming means to assist in assembly operations, of a take-off means comprising an electrified overhead conductor proximate said assembly line and having a pair of parallel rails provided with upper track surfaces extending along said assembly line a substantial distance, a plurality of rigid straddle contact members for engaging said track surfaces and having depending ends for preventing horizontal displacement of said members from said track surfaces, plate means supporting said contact members in spaced relation, means for conveying electrical power from said members and for moving said first means along said track surfaces, and a handle projecting from the bottom of said plate means between said contact members, said handle being operable from the assembly line to tilt said plate means for movement between the rails to associate and disassociate the contact members relative to the rails.

3. In combination with a conductor means having a plurality of spaced electrified overhead rails provided with upper track surfaces, of an electric power take-off means comprising a plurality of spaced contact members for straddling and engaging said track surfaces, means for preventing horizontal displacement of said members from said track surfaces, insulating means on which said members are mounted, an extension cord means associated with said contact members and said insulating means for conveying electrical power from said members and for moving said plate along said track surfaces, and depending handling means secured to said insulating means for applying and removing said contact members relative to said rails.

4. In combination with an assembly line having electrical power consuming means to assist in assembly operations, of a take-off means comprising an electrified overhead conductor proximate said assembly line and having a pair of parallel rails provided with upper track surfaces extending along said assembly line a substantial distance, a plurality of contact members for engaging said track surfaces in electrical contact therewith and having depending means for preventing horizontal displacement of said members from said track surfaces, insulating means supporting said contact members in spaced relation, means for conveying electrical power from said contact members to said power consuming means and for moving said take-off means along said track surfaces, and a depending handling means projecting from said insulating means between said contact members, said handling means being accessible from the assembly line to apply or remove said contact members relative to the rails.

LEONARD R. BOGARDUS.